(12) United States Patent
Chai et al.

(10) Patent No.: US 9,593,014 B2
(45) Date of Patent: Mar. 14, 2017

(54) METHODS OF ESTABLISHING LOW-RESISTANCE ELECTRICAL CONTACT TO CARBON NANOSTRUCTURES WITH GRAPHITIC INTERFACIAL LAYER

(75) Inventors: Yang Chai, Urbana, IL (US); Arash Hazeghi, San Francisco, CA (US); Kuniharu Takei, Berkeley, CA (US); Ali Javey, Berkeley, CA (US); H. S. Philip Wong, Stanford, CA (US)

(73) Assignees: The Board of Trustees of the Leland Stanford Junior University, Palo Alto, CA (US); The Regents of the University of California, Oakland, CA (US)

( * ) Notice: Subject to any disclaimer, the term of this patent is extended or adjusted under 35 U.S.C. 154(b) by 1203 days.

(21) Appl. No.: 13/199,702

(22) Filed: Sep. 7, 2011

(65) Prior Publication Data
US 2013/0059134 A1    Mar. 7, 2013

(51) Int. Cl.
| | | |
|---|---|---|
| *B32B 9/00* | (2006.01) | |
| *B82Y 10/00* | (2011.01) | |
| *H01B 1/04* | (2006.01) | |
| *C01B 31/02* | (2006.01) | |
| *B82Y 40/00* | (2011.01) | |

(52) U.S. Cl.
CPC ............. *B82Y 10/00* (2013.01); *H01B 1/04* (2013.01); *B82Y 40/00* (2013.01); *C01B 31/022* (2013.01); *Y10T 428/24851* (2015.01); *Y10T 428/24917* (2015.01); *Y10T 428/25* (2015.01); *Y10T 428/30* (2015.01)

(58) Field of Classification Search
CPC .......... C01B 31/022–31/0293; C01B 31/0438; C01B 2202/00; Y10T 428/30; Y10S 977/742
USPC ........ 428/408; 423/447.1; 977/742; 165/185
See application file for complete search history.

(56) References Cited

U.S. PATENT DOCUMENTS

| | | | |
|---|---|---|---|
| 2003/0064216 A1* | 4/2003 | Tobita et al. ................. | 428/323 |
| 2003/0122111 A1* | 7/2003 | Glatkowski .................. | 252/500 |
| 2005/0186104 A1* | 8/2005 | Kear ..................... | B82Y 30/00 419/11 |
| 2006/0223243 A1 | 10/2006 | Radosavljevic et al. | |
| 2006/0292716 A1 | 12/2006 | Gu et al. | |
| 2007/0158768 A1 | 7/2007 | Pilchowski et al. | |
| 2009/0184389 A1* | 7/2009 | Bertin ................ | H01L 27/1021 257/476 |

\* cited by examiner

*Primary Examiner* — Daniel H Miller
(74) *Attorney, Agent, or Firm* — Lumen Patent Firm

(57) ABSTRACT

A method of conductively coupling a carbon nanostructure and a metal electrode is provided that includes disposing a carbon nanostructure on a substrate, depositing a carbon-containing layer on the carbon nanostructure, according to one embodiment, and depositing a metal electrode on the carbon-containing layer. Further provided is a conductively coupled carbon nanostructure device that includes a carbon nanostructure disposed on a substrate, a carbon-containing layer disposed on the carbon nanostructure and a metal electrode disposed on the carbon-containing layer, where a low resistance coupling between the carbon nanostructure and metal elements is provided.

10 Claims, 4 Drawing Sheets

METHODS OF ESTABLISHING LOW-RESISTANCE ELECTRICAL CONTACT TO CARBON NANOSTRUCTURES WITH GRAPHITIC INTERFACIAL LAYER

FIELD OF THE INVENTION

The invention relates generally to the carbon nanostructures, and more specifically the invention relates to the methods and devices of improved electrical contact between carbon nanostructures and metal electrodes.

BACKGROUND OF THE INVENTION

Carbon nanostructure is a promising technology for use in transistors, interconnects, transparent electrodes, solar cells, LED's and battery electrodes, to name a few. Electrical contact is an indispensable part in electronic device/circuit. The small contact area makes the electrical coupling between carbon nanostructure and metal electrode extremely difficult. The large electrical contact resistance hinders the practical electronics applications of the carbon nanostructure, although it has high intrinsically electrical conductivity. Recent experimental results on both semiconducting and metallic carbon nanostructure devices revealed that the surface chemistry is very important for forming good electrical contact between carbon nanostructure and metal. This contact resistance possibly results from the non-wetting tubular structure and non-clean interface between CNT and metal. There is an atomic-level separation between CNT and metal for non-wetting surfaces.

Carbon nanostructures (carbon nanotube, graphene and carbon nanofiber) have been viewed as promising candidates for a variety of electronic applications. Electrical contact is an indispensable part in all kinds of electronic devices. The small contact area results a large contact resistance between carbon nanostructure and metal. The metal wetting to the carbon nanostructure is imperfect, where the metal atoms are not fully covered on the carbon nanostructure surface. An atomic-level physical gap exists between carbon nanostructure and metal. What is needed is a method or providing low contact resistance between metals and carbon nanostructures, and providing devices having low resistance coupling between the carbon nanaostructure and metal elements.

SUMMARY OF THE INVENTION

To address the needs in the art, a method of conductively coupling a carbon nanostructure and a metal electrode is provided that includes disposing a carbon nanostructure on a substrate, depositing a carbon-containing layer on the carbon nanostructure, according to one embodiment, and depositing a metal electrode on the carbon-containing layer.

According to one aspect of the invention, the metal electrode includes a metal-mediated layer or a metal carbide mediated layer.

In another aspect of the invention, the carbon-containing layer can include graphene, amorphous carbon, a carbon-hydrogen system or carbon-containing organic materials.

According to a further aspect of the invention, depositing of the carbon-containing layer comprises using deposition can include e-beam evaporation, thermal evaporation, sputtering, arc charging, metal-organic chemical vapor deposition, chemical vapor deposition, drop casting, inkjet printing, contact printing, stamping, or spin coating.

In yet another aspect of the invention, the metal electrode is a material can include Au, Pt, Pd, W, Al, Ta, Ca, Cu, Y or Sc.

According to one aspect of the invention, the metal mediated layer can include Ni, Co, Fe, Cr, Ti, Nb, Zr, Hf, V, Ta, Mo or Cu.

In one aspect of the invention, the carbon-containing layer is modified using a technique that can include high temperature annealing, electron beam irradiation or laser ablation.

In a further aspect of the invention, the carbon-containing layer is patterned using lithography or liftoff.

According to another aspect of the invention, the metal electrode is patterned using a liftoff process or an etching process.

In yet another aspect of the invention, a conduction channel of the carbon nanostructure is defined by lithography.

According to another aspect of the invention, the carbon nanostructure on the substrate, the carbon-containing layer on the carbon nanostructure and the metal electrode on the carbon-containing layer are annealed in oxygen-free ambient. In one aspect, the carbon-containing layer is graphitized after the annealing using a carbon-soluble material selected from the group consisting of Ni, Co, Fe, Cr, Ti, Nb, Zr, Hf, V, Ta, Mo and Cu. In a further aspect, the carbon-containing layer is graphitized using electron beam irradiation or laser ablation. In another aspect, the carbon nanostructure is fully wrapped by graphitic carbon after the annealing.

In another aspect of the invention, the carbon nanostructure can include nanotubes, nanowires, nanodots and graphene.

According to one aspect of the invention, the carbon nanostructure is a semiconducting structure or a metallic structure.

In yet another aspect of the invention, the substrate can include Si/SiO$_2$, quartz, glass, plastic, paper, polymide, or Kapton.

According to another embodiment of the invention, a conductively coupled carbon nanostructure device is provided that includes a carbon nanostructure disposed on a substrate, a carbon-containing layer disposed on the carbon nanostructure and a metal electrode disposed on the carbon-containing layer.

According to one aspect of the nanostructure device, the metal electrode includes a metal-mediated layer or a metal carbide mediated layer. In one aspect, the metal-mediated layer or the metal carbide mediated layer have a material that can include Ni, Co, Fe, Cr, Ti, Nb, Zr, Hf, V, Ta, Mo or Cu.

In a further aspect of the nanostructure device, the carbon-containing layer can include graphene, amorphous carbon, carbon-hydrogen system or carbon-containing organic materials.

In yet another aspect of the nanostructure device, the metal electrode can include Au, Pt, Pd, W, Al, Ta, Ca, Cu, Y or Sc.

According to another aspect of the nanostructure device, the metal electrode includes a mediated or metal carbide mediated layer.

In a further aspect of the nanostructure device, the carbon-containing layer is a patterned layer formed using lithography.

According to another aspect of the nanostructure device, the metal electrode is a patterned layer formed using a liftoff process or an etching process.

In one aspect of the nanostructure device, the device is annealed in oxygen-free ambient surroundings. According to one aspect, the carbon-containing layer is graphitized after the annealing using carbon-soluble Ni, Co, Fe, Cr, Ti, Nb, Zr, Hf, V, Ta, Mo or Cu. In a further aspect the carbon nanostructure is fully wrapped by graphitic carbon after the annealing.

According to one aspect of the nanostructure device, the carbon-containing layer is graphitized using electron beam irradiation or laser ablation.

In yet another aspect of the nanostructure device, the carbon-containing layer is graphitized using carbon-soluble Ni, Co, Fe, Cr, Ti, Nb, Zr, Hf, V, Ta, Mo and Cu.

In one embodiment of the nanostructure device, the nanostructure device further comprises a semiconducting structure or a metallic structure.

In another aspect of the nanostructure device, the carbon nanostructure can include nanotubes, nanowires, nanodots or graphene According to one aspect of the nanostructure device, the substrate can include $Si/SiO_2$, quartz, glass, plastic, paper, polymide or Kapton.

DETAILED DESCRIPTION

Figure 1:
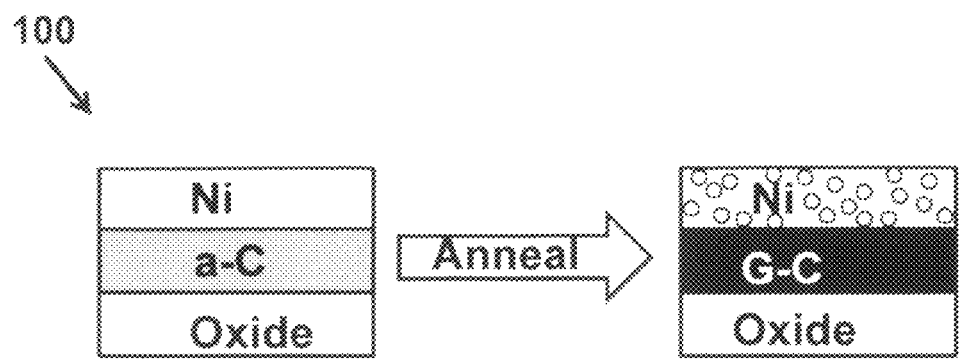
FIG. 1 shows a schematic diagram of the formation of the graphitic interfacial layer, according to one embodiment of the invention.

The present invention provides amorphous carbon (a-C) as an interfacial layer between carbon nanostructures and metal. The a-C can be graphitized at high temperature and catalyzed by carbon-soluble metal in presence of a catalyst. This graphitic carbon has similar $sp^2$ bonding as the carbon of the carbon nanostructures, extending effective wave function overlap for conduction band electrons in the form of $P_z$-$P_z$ covalent bonding. The high temperature annealing process also improves the metal wetting to carbon nanostructures, and increases the actual contact area.

The present invention relates generally to electronic devices based on the carbon nanostructure, and more specifically includes Carbon Nanotube (CNT), where the devices can include Field Effect Transistors, CNT sensors, CNT interconnect wiring, CNT field emission devices, CNT memory switch, Graphene Nanoribbon Field Effect transistor, Graphene interconnect wiring, lasers, light emitting diodes, photo-detectors, solar cells, and transparent electrodes.

In one embodiment, the present invention provides a novel method to improve the electrical coupling between carbon nanostructure and metal electrode. The invention lowers the electrical resistance to the carbon nanostructure by at least an order of magnitude.

In another embodiment of the invention, a method of providing low-resistance electrical contact between carbon nanostructures includes providing a carbon layer on top of carbon nanostructures, providing a metal mediated or a metal carbide mediated metal layer on top of the carbon layer, and forming the low-resistance contact. The carbon layers can include amorphous carbon, graphene, carbon-hydrogen system and carbon-contained organic molecules. The forming of the carbon layer can include e-beam evaporation, thermal evaporation, sputtering, arc charging or chemical vapor deposition. The materials used for the metal layer formation or metal carbide layer formation can include Ni, Co, Fe, Cr, Ti, Nb, Cu and other transition metal and/or metal carbide. The low-resistance contact can be formed by high temperature annealing, electron beam irradiation or laser ablation.

The present invention introduces the graphitic interfacial layer between a carbon nanostructure (for example a CNT) and metal, which lowers the electrical resistance to the carbon nanostructure by at least an order of magnitude. The present invention solves the problem of high contact resistance to carbon nanostructures.

Carbon nanostructures, according to the invention, are made of both semiconducting and metallic structures, which have different applications. For example, a semiconducting CNT is used as an active transistor, either as an amplifier in an analogue circuit or as a logic gate in logic circuits, and the metallic CNT is used at the interconnect/wiring, electrode, and in some passive devices.

In this discussion, CNTs will be used as an example of the invention, however it is understood that other carbon nanostructures could also be used.

According to one embodiment of the invention, a graphitic interfacial layer is used to wet the surface of a CNT and dramatically lower the contact resistance of metal to metallic single-wall carbon nanotube (m-CNT). Using Ni-catalyzed graphitization of amorphous carbon (a-C), the average resistance of metal/m-CNT is reduced by 7× compared to the same contact without the graphitic layer. Small-signal conductance measurements from 77K to 300K reveal the effective contact improvement.

Figure 2:
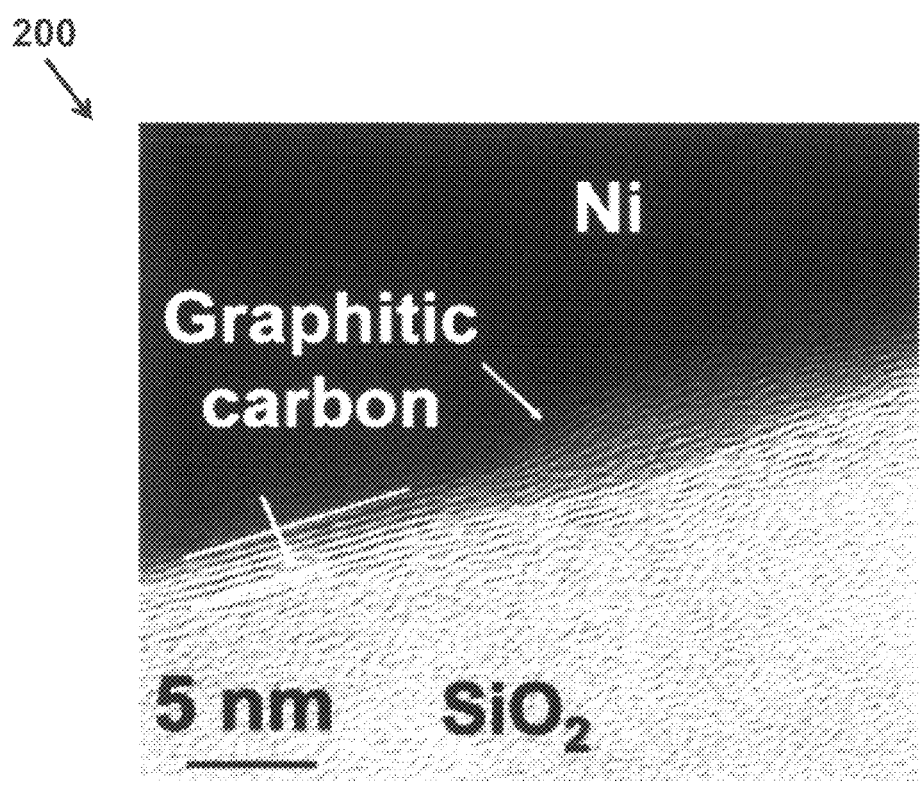
FIG. 2 shows a cross-section TEM image with the presence of graphitic layer having multiple layers sandwiched between the metal layer and oxide layer, according to one embodiment of the invention.

Compared to regular metal contact, carbon itself is a material with the best wettability to the CNT surface. For example, a thin carbon film ("nominal" thickness ~2 nm) was deposited by e-beam evaporation method on top of the CNT surface as an interfacial layer. The carbon layer was only located at the contact region to CNT. The pattern of carbon layer was defined by photo-lithography and lift-off. The as-deposited carbon has an amorphous structure that includes both $sp^2$ and $sp^3$ bonding. The amorphous carbon (a-C) can be graphitized with the assist of transitional metal catalyst at high temperature. FIG. 1 shows a schematic diagram of the formation of the graphitic interfacial layer. A thin Ni layer (~5 nm) was used as the catalyst on top of the a-C layer with the same pattern. The whole stack was annealed at the temperature of 850° C. in a furnace, where the chamber was pumped to base pressure (~50 mTorr) by a mechanical pump before raising the temperature. The anneal process was then conducted in Ar or $H_2$ ambient. After the anneal process, the CNT is fully wrapped by graphitic carbon (G-C) (see FIG. 4b). The graphitic carbon can be formed both on top and underneath Ni layer if the Ni thickness is optimized. A cross-sectional TEM sample is presented to characterize the interface underneath the Ni layer. The cross-section TEM image 200 in FIG. 2 clearly shows the presence of G-C 202, which has multiple layers sandwiched between the metal layer 204 and oxide layer 206. The lattice distance of the G-C 202 is 3.4 Å, the hallmark of the graphite (200) direction. When applied to carbon nanostructures, the G-C interfacial layer 202 has good wetting to both metal and CNT, and the similar $sp^2$ to structure to CNT. The vacuum gaps between metal and CNT are bridged by the G-C layer 202. In the ideal case, the coupling between the layers of the graphite is weak. However, the CNT produced by chemical vapor deposition method is typically defective. The anneal process is conducted at a high temperature with both solid carbon and Ni catalyst. These conditions are similar to the CNT growth process. It is reasonable to expect that the a-C possibly reacts with the defective sites in CNT assisted by Ni catalyst, forming a strong chemical bonding to the CNT at the contact region. The G-C interfacial layer with covalent chemical bonding to CNT enlarges the contact area between the CNT and the metal, and provides more conduction channels at the contact region. The graphitic layer 202 has a ~2 nm thickness, a micrometer width, and many defective sites. These help the carriers transport through graphitic interfacial layer easily. Thus, the G-C interfacial layer 202 helps establish low-resistance electrical contact to single-walled CNT. To compare the effect of G-C interfacial layer 202 on the electrical contact to CNT, the electrical contact was fabricated with and without G-C layer 202 on the same CNT to minimize the variations resulted from the different CNTs. FIGS. 3a-3d show a schematic of the process flow fabricating a test structure, and FIG. 5 shows the SEM images of a test structures. The dimension of the metal contact finger to the CNT is 5 μm.

Figure 3:
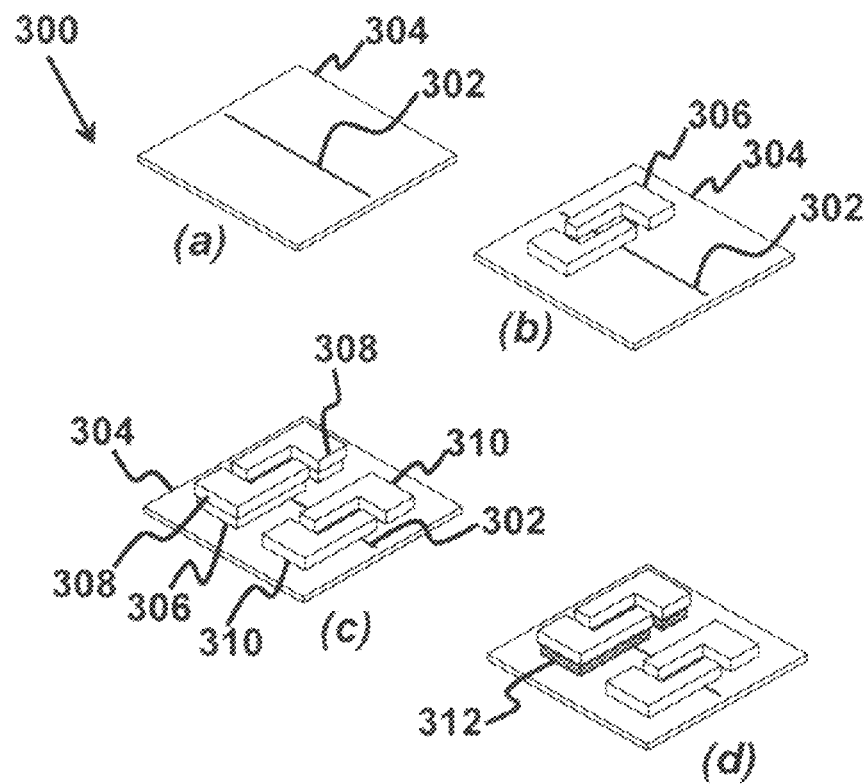
FIGS. 3a-3d show a schematic drawing of the process flow for fabricating a test structure, according to one embodiment of the invention.

FIGS. 3a-3d show a process flow diagram for fabricating a test structure 300. Horizontally aligned single walled CNTs 302 (200 μm long) were grown on quartz substrate using methane and Fe catalyst. The diameter of the CNT 302 is 1.2±0.3 nm. The CNTs 302 were then transferred to a Si/SiO2 substrate 304, as shown in FIG. 3a. FIG. 3b shows a 2.5 nm-thick a-C layer 306 deposited by e-beam evaporation on top of the CNT 302 and patterned by lithography. FIG. 3c shows a Au/Ni metal contact 308 subsequently patterned on the a-C surface 306 by liftoff process. The channel length of the CNT device was defined by standard photolithography. The device length studied here of the CNT 302 is 1 μm between the two metal electrodes 308. A control structure 310 without an a-C interfacial layer 306 was also fabricated on the same CNT 302. Unwanted CNTs 302 on the substrate were etched by oxygen plasma. The average density of the CNTs is 3-5 CNT/μm, thus there are ~1-3 CNTs per 1 μm-width device. The fabricated samples were annealed at 750° C. for 10 min in hydrogen. After the anneal process, the a-C interfacial layer 306 is graphitized 312, assisted by the carbon-soluble Ni.

Figure 4:
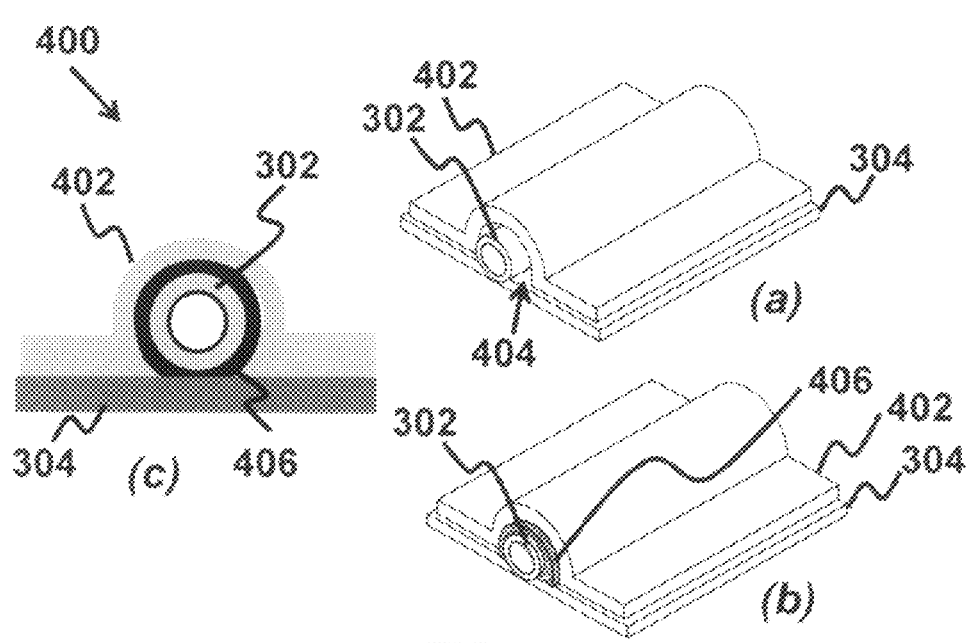
FIGS. 4a-4c show schematic diagrams of providing a conductively coupled carbon nanostructure device, according to one embodiment of the invention.
Figure 5:
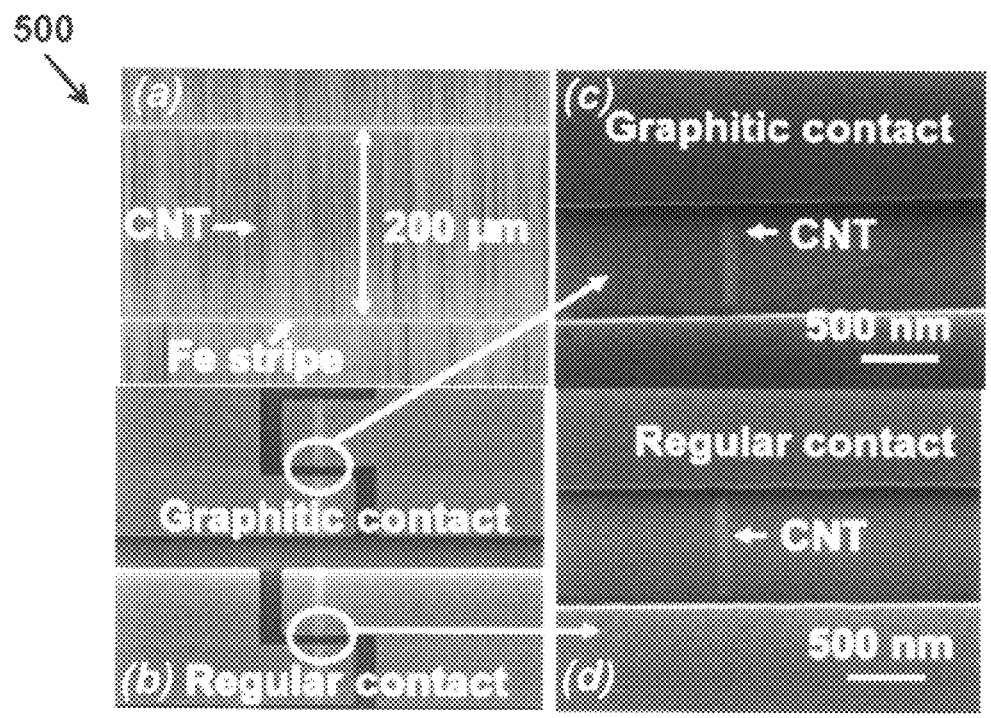
FIGS. 5a-5d show SEM images of the fabricated device shown in FIGS. 3a-3d, according to one embodiment of the invention.
Figure 6:
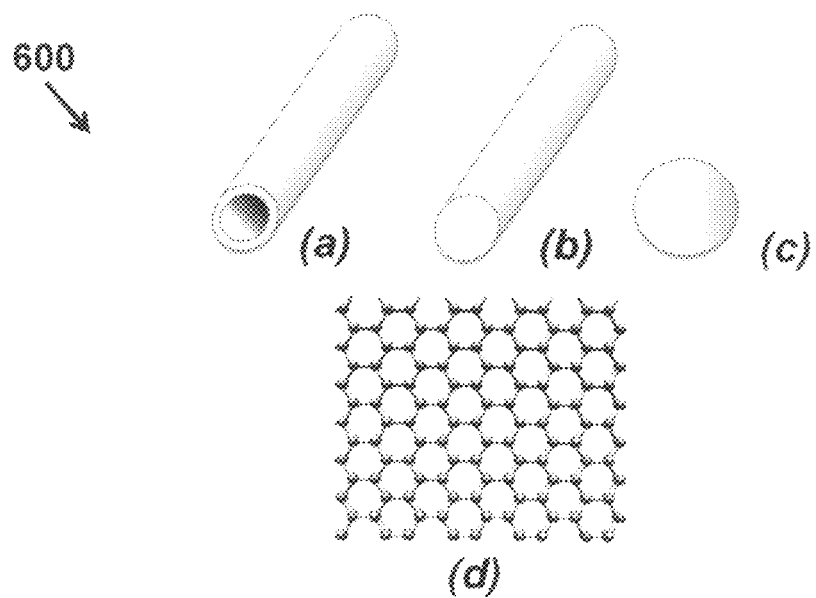
FIGS. 6a-6d show other embodiments of the nanostructure devices used in the conductively coupled carbon nanostructure device, according to one embodiment of the invention.

FIGS. 4a-4c show schematic diagrams of providing a conductively coupled carbon nanostructure device 200, for example the CNT 302 of FIGS. 3a-3d. FIG. 4a shows the CNT 302 disposed on substrate 304. A metal electrode 402 is deposited on top of the CNT 302 and substrate 304. As shown, a finite separation 404 between the CNT 302 and the electrode 402 exists that is caused by non-wetting or a non-clean metal/CNT interface.

FIG. 4b shows a CNT 302 disposed on a substrate 304. The substrate 304 can include Si/SiO$_2$, quartz, glass, plastic, paper, polymide or Kapton. A carbon-containing layer 406 is disposed on the CNT 302, where the carbon-containing layer 406 can include graphene, amorphous carbon, carbon-hydrogen system or carbon-containing organic materials. A metal electrode 402 is disposed on the carbon-containing layer 406. The carbon-containing layer 406 can be a patterned layer formed using lithography and the metal electrode 402 can be a patterned layer formed using a liftoff process or an etching process. (see FIGS. 3b-3d). The metal electrode 402 can include a metal-mediated layer or a metal carbide mediated layer having a material that can include Ni, Co, Fe, Cr, Ti, Nb, Zr, Hf, V, Ta, Mo or Cu. Further, the metal electrode 402 can include Au, Pt, Pd, W, Al, Ta, Ca, Cu, Y or Sc. The carbon-containing layer 406 provides a graphitic interface that has similar bonding to CNT 302, extending effective wave-function overlap, improving the wetting and enlarging the contact area. In one embodiment, the device is annealed in oxygen-free ambient surroundings. Further, the carbon-containing layer is graphitized after the annealing using carbon-soluble Ni, Co, Fe, Cr, Ti, Nb, Zr, Hf, V, Ta, Mo or Cu. Thus, the carbon nanostructure is fully wrapped by graphitic carbon after the annealing, as shown in FIG. 4c.

FIGS. 5a-5d show SEM images of the fabricated device shown in FIGS. 3a-3d. To ensure a direct comparison, the same 200 μm long CNT was used for both devices with and without the graphitic interfacial layer metal electrode. The CNTs extend beyond the electrodes and make side contacts to the electrodes. The SEM images of FIG. 5a show a 200 μm long horizontally aligned CNT, the images of FIG. 5b show a test structure on the same CNT, the images of FIG. 5c show the CNT with graphitic interfacial layer, and the images of FIG. 5c show Au/Ni pad only without the graphitic interfacial layer.

According to one aspect of the nanostructure device, the carbon-containing layer is graphitized using electron beam irradiation or laser ablation.

In yet another aspect of the nanostructure device, the carbon-containing layer is graphitized using carbon-soluble Ni, Co, Fe, Cr, Ti, Nb, Zr, Hf, V, Ta, Mo and Cu.

In one embodiment of the nanostructure device, the nanostructure device further can include a semiconducting structure or a metallic structure.

FIGS. 6a-6d show other embodiments of the nanostructure devices 300, where the carbon nanostructures 300 can include nanotubes 302 (FIG. 3a), nanowires 304 (FIG. 3b), nanodots 306 (FIG. 3c) or graphene 308 (FIG. 3d).

Figure 7:
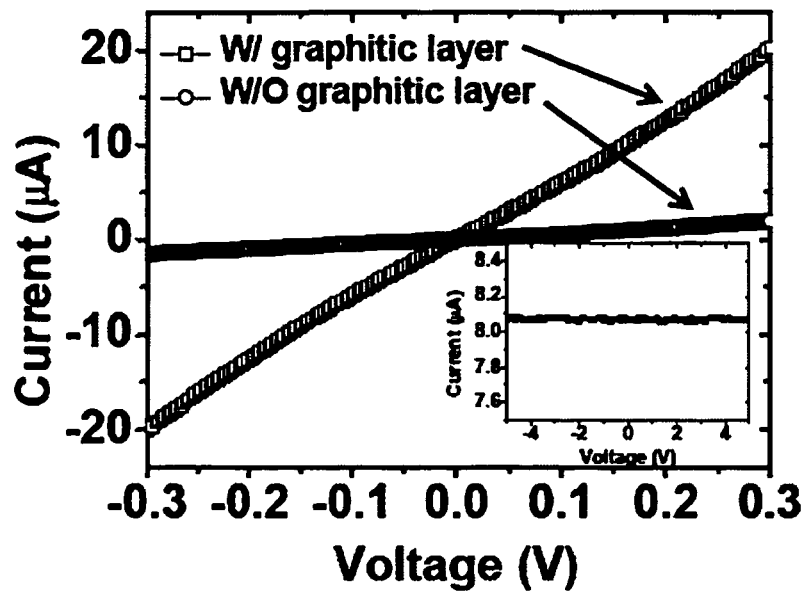
FIG. 7 shows the typical I-V curves of the same metallic CNT with and without graphitic interfacial layer, according to one embodiment of the invention.

FIG. 7 shows the typical I-V curves of the same CNT with and without graphitic interfacial layer. The as-synthesized CNTs are single-wall CNTs and have a mixture of semiconducting CNT and metallic CNT. CNT devices were selected without back-gate modulation and measured the resistance for the different samples in a two-point configuration. As shown, the drive current in the CNT device increase dramatically after introducing the graphitic interfacial layer. The CNT with the graphitic layer shows more drive current than that without graphitic layer. Inset shows the current as a function of the back-gate voltage. In this example, the CNT has weak gate modulation over a large gate voltage scan, indicating the metallic-like CNT.

Figure 8:
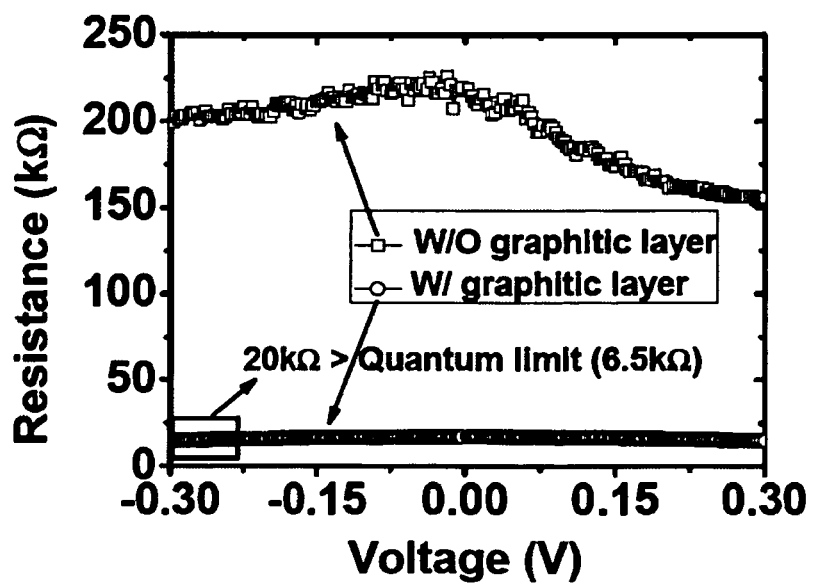
FIG. 8 shows the DC bias-dependent resistance of the same CNT with and without graphitic interfacial layer, according to one embodiment of the invention.

FIG. 8 shows the DC bias-dependent resistance of the same CNT with and without graphitic interfacial layer. The large dependency of the resistance of the CNT without the graphitic layer suggests the existence of the contact barrier, where the resistance for the CNT with the graphitic layer is significantly lower. Measured lower resistance (20 KΩ) is close to but still higher than the quantum conductance limit (6.5KΩ). This is due to scattering (diffusive transport) inside the channel and residual barrier at the contacts.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, Field Effect Transistors, CNT sensors, CNT interconnect wiring, CNT field emission devices, CNT memory switch, Graphene Nanoribbon Field Effect transistor, Graphene interconnect wiring, lasers, light emitting diodes, photo-detectors, solar cells, and transparent electrodes.

All such variations are considered to be within the scope and spirit of the present invention as defined by the following claims and their legal equivalents.

What is claimed:

1. An electrically conductive carbon nanostructure device comprising a single carbon nanotube disposed on a planar substrate, an ~2 nm thick nickel catalyzed electrically conductive amorphous carbon-containing interfacial layer disposed on said single carbon nanotube, wherein said single carbon nanotube is fully wrapped by said ~2 nm thick nickel catalyzed electrically conductive amorphous carbon-containing interfacial layer, and a metal electrode disposed on top of said ~2 nm thick nickel catalyzed electrically conductive amorphous carbon-containing interfacial layer and on top of said planar substrate, wherein said ~2 nm thick nickel catalyzed electrically conductive amorphous carbon-containing interfacial layer is in a graphitized state, wherein said ~2 nm thick nickel catalyzed carbon-containing interfacial layer in a graphitized state comprises a covalent chemical bond to said single carbon nanotube having an enhanced electrical contact area relative to a non-graphitized electrically conductive interfacial layer, wherein said covalent bonding between said single carbon nanotube and said ~2 nm thick nickel catalized electrically conductive amorphous carbon-containing interfacial layer in a graphitized state comprises a $sp^2$ bonding that is similar to a $sp^2$ bonding of said the carbon nanotube forming an extended effective wave function overlap for electrical conduction band electrons in the form of $P_z$-$P_z$ covalent bonding, wherein said ~2 nm thick nickel catalized electrically conductive amorphous electrically conductive carbon-containing interfacial layer in a graphitized state is configured to enhance electrical conductivity between said single carbon nanotube and said metal electrode.

2. The carbon nanostructure device of claim 1, wherein said metal electrode comprises a metal-mediated layer or a metal carbide mediated layer.

3. The carbon nanostructure device of claim 2, wherein said metal-mediated layer or said metal carbide mediated layer comprises a material selected from the group consisting of Ni, Co, Fe, Cr, Ti, Nb, Zr, Hf, Ta, Mo and Cu.

4. The carbon nanostructure device of claim 1, wherein said ~2 nm thick nickel catalyzed carbon-containing interfacial layer in a graphitized state is selected from the group consisting of graphene, amorphous carbon, carbon-hydrogen system and carbon-containing organic materials.

5. The carbon nanostructure device of claim 1, wherein said metal electrode is a material selected from the group consisting of Au, Pt, Pd, W, Al, Ta, Ca, Cu, Y and Sc.

6. The carbon nanostructure device of claim 1, wherein said metal electrode comprises a mediated or metal carbide mediated layer.

7. The carbon nanostructure device of claim 1, wherein said ~2 nm thick nickel catalyzed carbon-containing interfacial layer in a graphitized state is a patterned layer.

8. The carbon nanostructure device of claim 1, wherein said metal electrode is a patterned layer.

9. The carbon nanostructure device of claim 1 further comprises a semiconducting structure or a metallic structure.

10. The carbon nanostructure device of claim 1, wherein said substrate is selected from the group consisting $Si/SiO_2$, quartz, glass, plastic, paper, polymide and Kapton.

* * * * *